(12) United States Patent
Holt

(10) Patent No.: US 10,031,498 B1
(45) Date of Patent: Jul. 24, 2018

(54) METHOD AND APPARATUS FOR INTEGRATING CONTROL SYSTEMS

(71) Applicant: HOLT CONTROL SYSTEMS, INC., Baton Rouge, LA (US)

(72) Inventor: Stanley Holt, Baton Rouge, LA (US)

( * ) Notice: Subject to any disclaimer, the term of this patent is extended or adjusted under 35 U.S.C. 154(b) by 179 days.

(21) Appl. No.: 14/887,085

(22) Filed: Oct. 19, 2015

Related U.S. Application Data

(60) Provisional application No. 62/067,115, filed on Oct. 22, 2014.

(51) Int. Cl.
*H01R 11/00* (2006.01)
*G05B 15/02* (2006.01)

(52) U.S. Cl.
CPC .................. *G05B 15/02* (2013.01)

(58) Field of Classification Search
CPC ...... H01R 11/00; H01R 25/003; H01R 31/06; H01B 7/08; H01B 7/0807
USPC .............. 439/502, 623, 894, 638; 174/117 F
See application file for complete search history.

(56) References Cited

U.S. PATENT DOCUMENTS

| | | | | |
|---|---|---|---|---|
| 5,472,347 A * | 12/1995 | Nordenstrom | ....... | G05B 19/054 439/61 |
| 5,995,855 A * | 11/1999 | Kiani | ................. | A61B 5/14551 600/310 |
| 6,106,328 A * | 8/2000 | O'Neal | .................. | H01R 27/02 439/498 |
| 6,459,707 B1 * | 10/2002 | Becker | ................... | H02H 9/004 361/1 |
| 6,531,657 B1 * | 3/2003 | Jones, Jr. | ............... | H01R 31/06 174/112 |
| 7,134,908 B2 * | 11/2006 | Wu | ........................ | H01R 25/00 439/502 |
| 8,043,115 B2 * | 10/2011 | Zieger | ................... | H05K 1/189 439/502 |
| 8,235,746 B2 * | 8/2012 | He | ......................... | H01R 13/70 439/502 |
| 2003/0109171 A1 * | 6/2003 | Morgan | ............... | H01B 7/0045 439/502 |
| 2006/0270272 A1 * | 11/2006 | Falco | .................... | G06F 13/409 439/502 |

OTHER PUBLICATIONS

Purported Sale of Invention. Purchase Order(s) 5004717 & 5004701 dated Jan. 28, 2013 and Feb. 19, 2013.

* cited by examiner

*Primary Examiner* — Hae Moon Hyeon

(57) ABSTRACT

A method and apparatus for migrating a first control system to a second control system. The method includes receiving a first plurality of signals from an element of a first control system, segregating the first plurality of signals into individual signals, and outputting the individual signals as a second plurality of signals to a second control system. The apparatus includes an input module configured to receive a first plurality of signals from an element of a first control system and segregate the first plurality of signals into individual signals, an isolation module, and an output module configured to receive the individual signals and output the individual signals as a second plurality of signals to a second control system.

18 Claims, 6 Drawing Sheets

METHOD AND APPARATUS FOR INTEGRATING CONTROL SYSTEMS

CROSS-REFERENCE TO RELATED APPLICATIONS

This application claims the benefit of U.S. Provisional Application No. 62/067,115, filed Oct. 22, 2014, and which is hereby incorporated by reference in its entirety.

TECHNICAL FIELD

The present disclosure relates in general to an apparatus and method for migrating a first control system to a second control system.

BACKGROUND ART

When process automation was first developed over fifty years ago, a number of industrial facilities developed their own proprietary systems in response to the lack of commercially available process automation systems capable of controlling their processes safely and efficiently. However, rapidly changing computing and automation technologies, such as changes in networking, connectivity, communication protocols, integrated systems, real-time information access and embedded intelligence have allowed commercially available process automation systems to often match and in some cases even surpass the reliability and efficiency of proprietary systems. Consequently, in many cases, it no longer makes business sense to devote the time, money and resources necessary to continue to develop and maintain proprietary process automation systems. As a result, many industrial facilities are now upgrading their existing proprietary systems with new technology.

Typically, when a new control system is implemented, elements of the prior control system are retained in the new control system. Therefore, in many cases, it is necessary for at least one element of the prior control system to be able to communicate with the new control system. However, typically, a new control system is not compatible with the prior control system. Therefore, in view of the above, a need exists for an apparatus and method that is capable of at least one element of the prior control system to a new control system.

SUMMARY OF INVENTION

The purpose of the invention is to accomplish at least one of the following objects. An object of this invention is to provide an apparatus and method for migrating at least one element of a first control system to a second control system. A further object of this invention is to provide an apparatus and method that can segregate a first plurality of signals received from the first control system into individual signals that can be sent as a second plurality of signals to the second control system. Additional objects and advantages of this invention shall become apparent from the ensuing descriptions of the invention.

According to a first aspect of the invention, an apparatus for migrating at least one element of a first control system to a second control system is provided. The apparatus includes an input module configured to receive a first plurality of signals from the field wiring of the first control system and segregate the first plurality of signals into individual signals, an isolation module, and an output module configured to receive the individual signals and output the individual signals as a second plurality of signals to the second control system.

According to a second aspect of the invention, migrating at least one element of a first control system to a second control system is provided. The method includes receiving a first plurality of signals from the field wiring of a first control system, segregating the first plurality of signals into individual signals, and receiving and outputting the individual signals as a second plurality of signals to a second control system.

The above brief summary of the invention presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the above brief summary has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF DRAWINGS

The accompanying drawings illustrate various embodiments of this invention. However, it is to be understood that these embodiments are not intended to be exhaustive, nor limiting of the invention. These embodiments are but examples of some of the forms in which the invention may be practiced.

DESCRIPTION OF EMBODIMENTS

Figure 1:
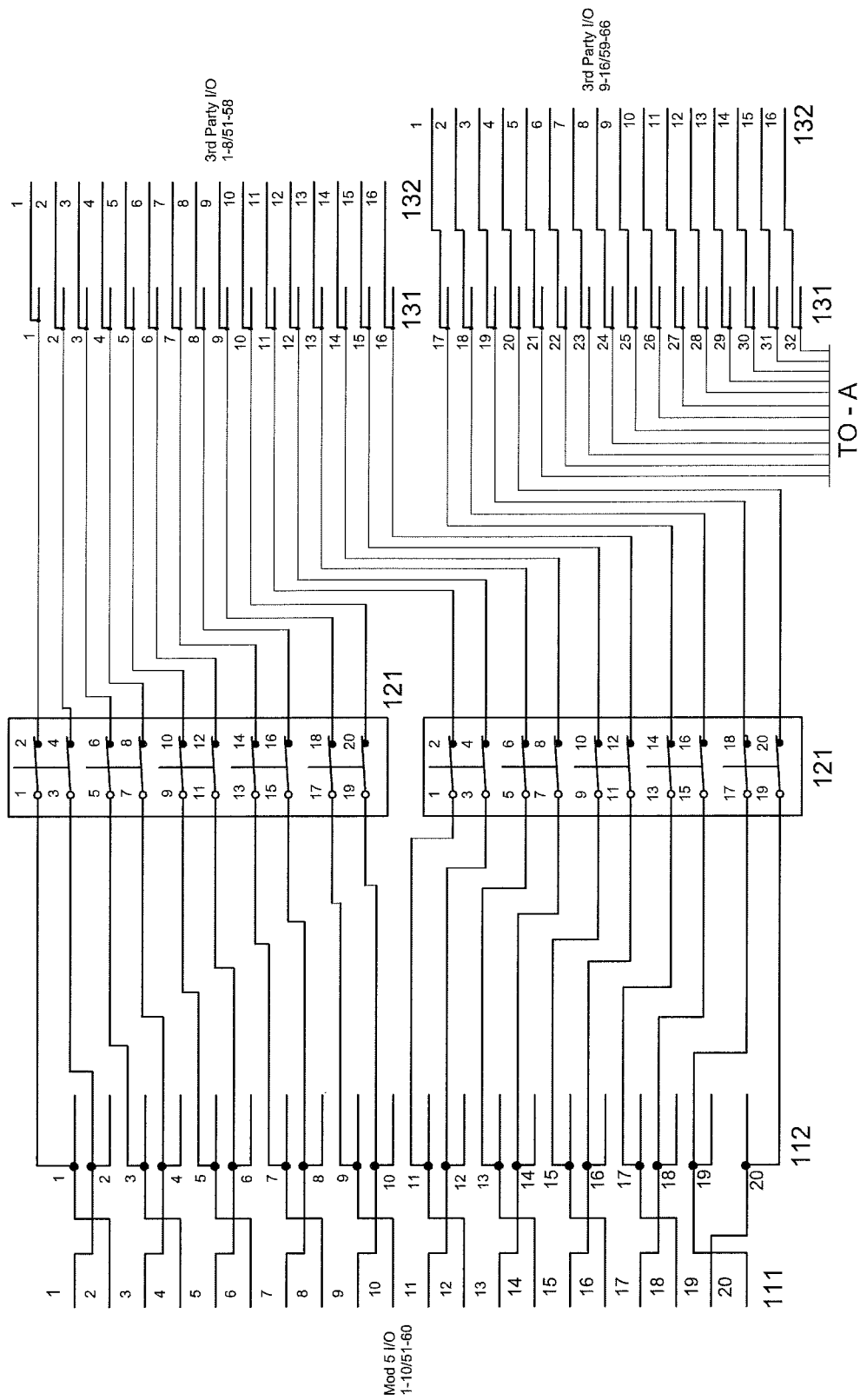
FIG. 1 is a wiring diagram of an apparatus for migrating at least one element of a first control system to a second control system according to this invention, wherein the markings "TO-A" indicates how the figure relates to FIG. 2.
Figure 2:
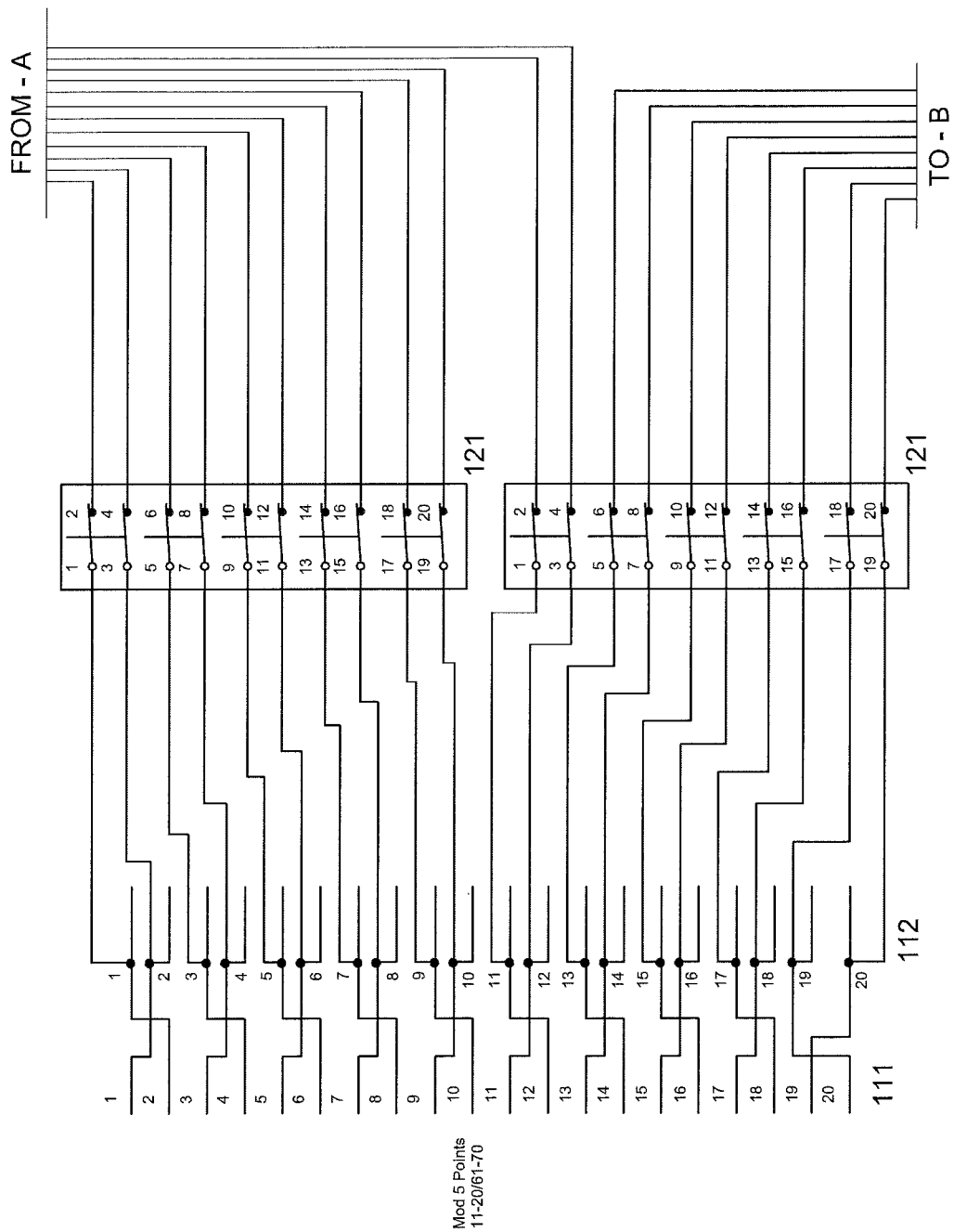
FIG. 2 is a continuation of the wiring diagram shown in FIG. 1, wherein the markings "FROM A" indicate how the figure relates to FIG. 1 and wherein the markings "TO-B" indicate how the figure relates to FIG. 3.
Figure 3:
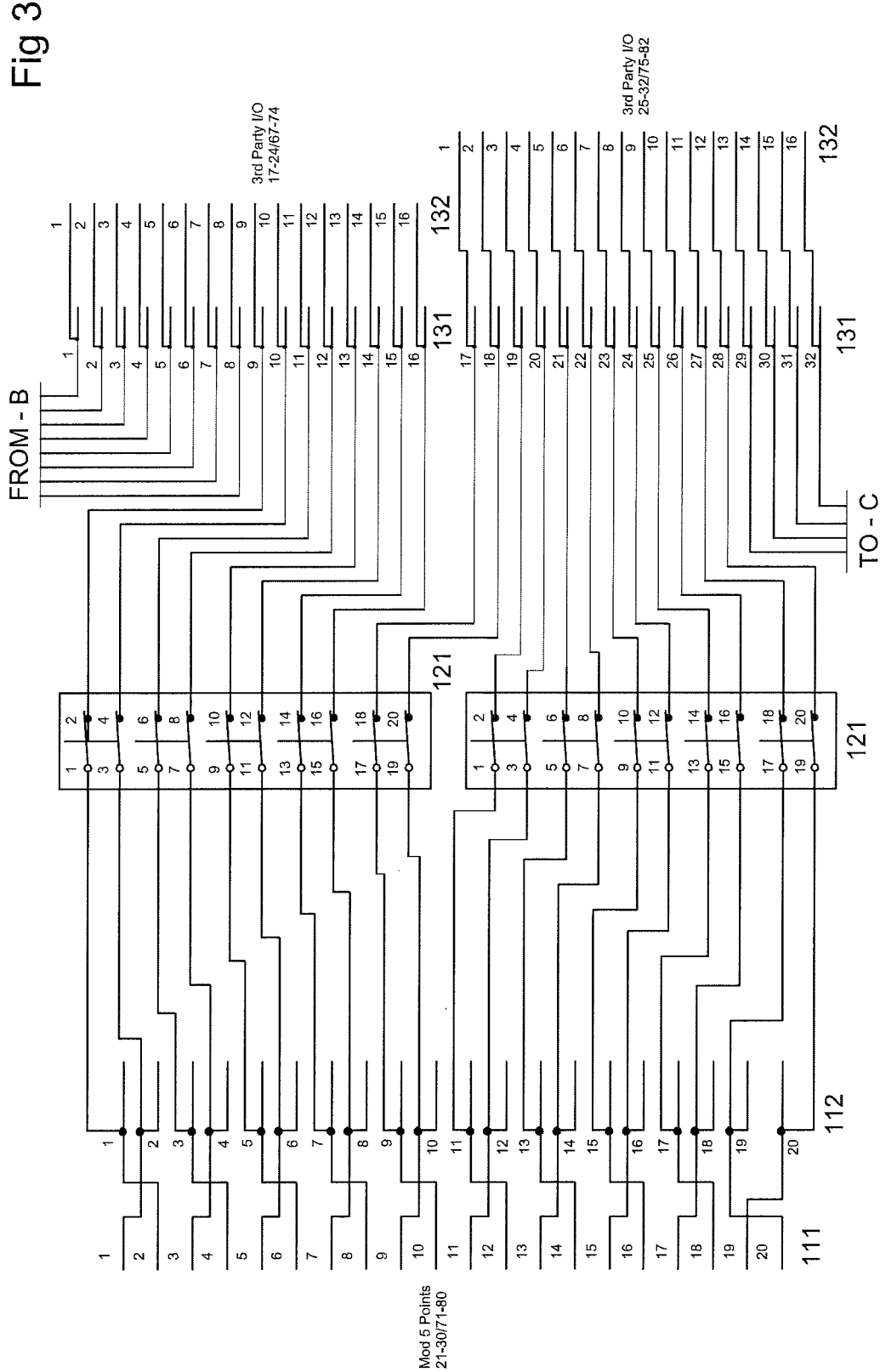
FIG. 3 is a continuation of the wiring diagram shown in FIG. 2, wherein the markings "FROM B" indicate how the figure relates to FIG. 2 and wherein the markings "TO-C" indicate how the figure relates to FIG. 4.
Figure 4:
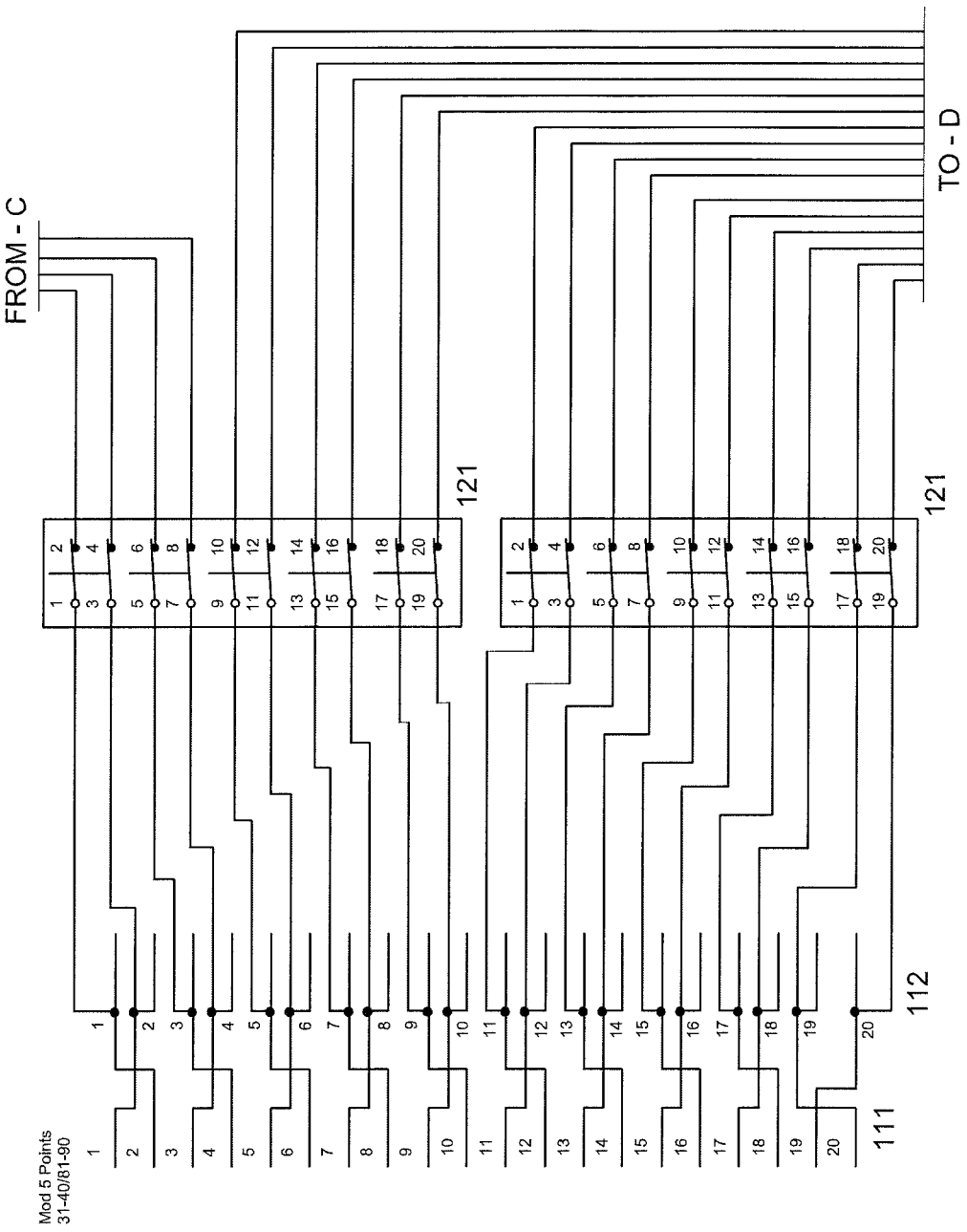
FIG. 4 is a continuation of the wiring diagram shown in FIG. 3, wherein the markings "FROM C" indicate how the figure relates to FIG. 3 and wherein the markings "TO-D" indicate how the figure relates to FIG. 5.
Figure 5:
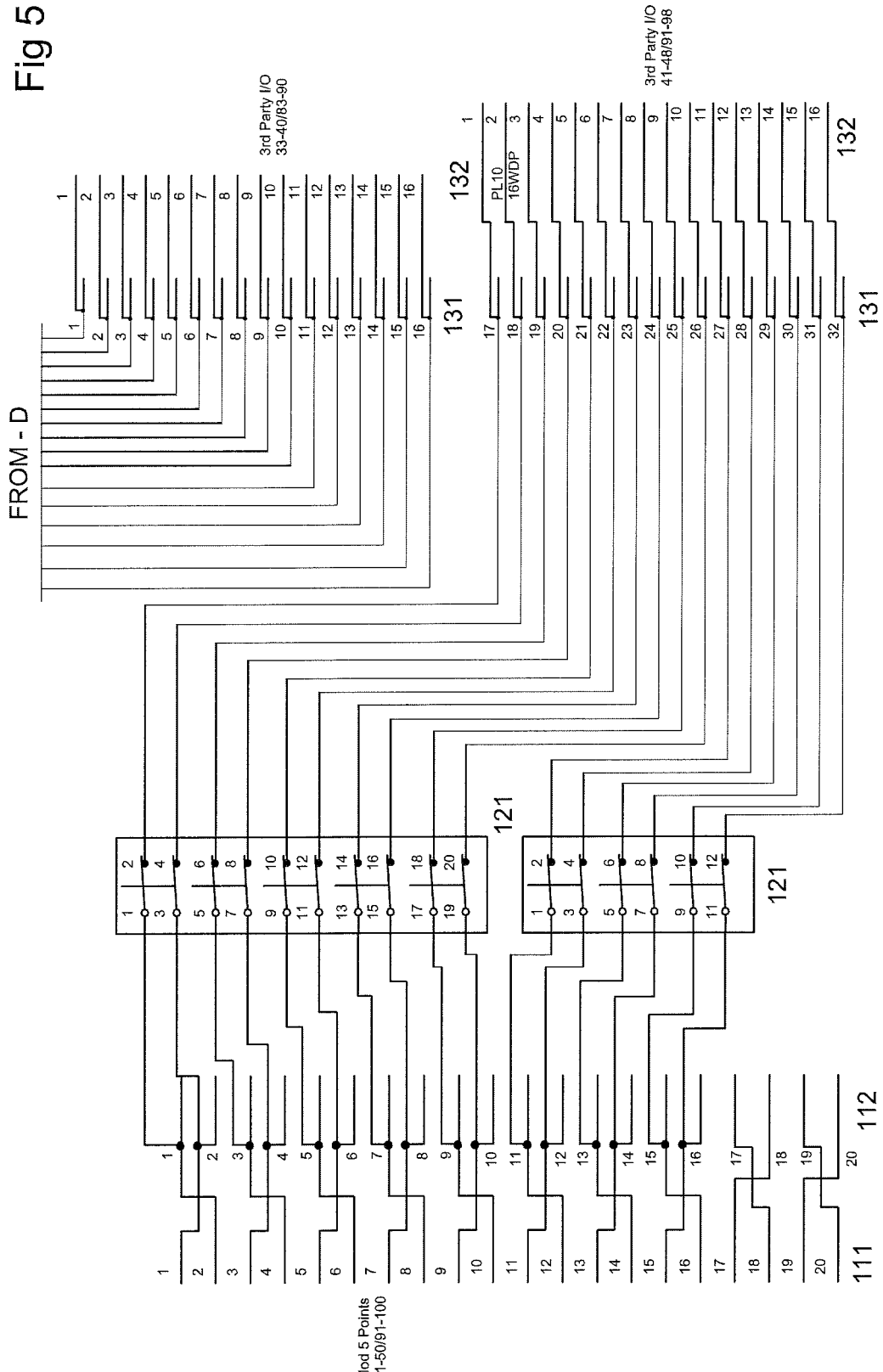
FIG. 5 is a continuation of the wiring diagram shown in FIG. 4, wherein the markings "FROM D" indicate how the figure relates to FIG. 4.

Without any intent to limit the scope of this invention, reference is made to the figures in describing the preferred embodiments of the invention. FIGS. 1-5 depict a wiring diagram for an apparatus for migrating at least one element of a first control system to a second control system in accordance with this invention. The apparatus comprises an input module, an isolation module, and an output module.

The input module comprises at least one input ribbon cable adaptor 111 and a plurality of break-out terminals 112. The input module is configured to receive a first plurality of signals from the field wiring of a first control system and segregate the first plurality of signals into individual signals. The input ribbon cable adaptor 111 receives the first plurality of signals from field wiring of the first control system via an input ribbon cable. The input ribbon cable typically comprises a plurality of conductors for transmitting the first plurality of signals to the input ribbon cable adaptor 111. The input ribbon cable adaptor 111 comprises a plurality of pins configured to receive the plurality of conductors, and segregate the first plurality of signals into individual signals. Each individual signal is made available to the break-out terminal 112 and the isolation module. Each break-out terminal 112 can accept a wire for distribution of the individual signal to another device ("hard wiring"), or another channel via a break-in terminal 131 as discussed below.

In a typical arrangement, two conductors per individual signal are provided. Thus, each signal there are two conductors in the input ribbon cable, the number of pins in the input ribbon cable adaptor 111, and the number of signal break-out terminals 112. In a preferred embodiment, the first plurality of signals comprise a number of signals that is a multiple of ten, e.g., 10, 20, 30, 40, 50, 60, 70, 80, 90, 100, and so forth. For example, 10 signals can be transmitted by a 20 conductor input ribbon cable to a 20 pin input ribbon cable adaptor where the 10 signals are segregated into 10 individual signals by 20 break-out terminals.

The isolation module comprises at least one signal isolator 121. In a preferred embodiment, the number of signal isolators 121 corresponds to the number of the first plurality of signals, e.g., 10 signal isolators for 10 signals. Under normal conditions, the signal isolator 121 will pass the signal received from the input module and pass the signal onto the output module. By using the signal isolator 121, the input module and output module can be separated such that the signal will not be passed from the input module to the output module. If the signal isolator separates the signals from the input module and output module, then the input signal is made available to the break-out terminals of the input module and the output signal is made available to the break-in terminals of the output module. The signals present at the input module and output module are isolated from each other.

The output module is configured to receive the individual signals and output the individual signals as a second plurality of signals to a second control system. The output module preferably comprises a plurality of break-in terminals 131 and signal isolators 121 for receiving the individual signals and at least one output multiple conductor cable adaptor 132 for outputting the second plurality of signals. In a preferred embodiment, the second plurality of signals comprise a number of signals that is a multiple of eight, e.g., 8, 16, 24, 32, 40, 48, 56, 64, 72, 80, 88, 96, and so forth. For example, 8 signals can be received by 16 break-in terminals or signal isolators which transmit the 8 signals to a 16 pin output cable adaptor where the 8 signals are sent to the second control system using a 16 conductor output cable. Each break-in terminal 131 can accept a wire from another device or channel from each break-out terminal 112.

The number of break-in terminals 131 typically corresponds to the number of signals transmitted from the isolation module. Each pair of break-in terminals 131 typically receives one individual signal. The break-in terminal 131 then transmits the signal to the output cable adaptor 132. The output cable adaptor 132 comprises a plurality of pins configured to transmit the signals to the output cable. The output cable comprises a plurality of conductors for transmitting the second plurality of signals to the second control system. The output cable can be any multi conductor cable, including, but not limited to, a multi conductor ribbon cable.

The signals may comprise analog or digital signals. The analog signals may be analog input (AI) or analog output (AO) signals. Analog signals are variable, i.e., they can have multiple states. Analog input signals can represent items such as temperature, flow rate, tank level, and so forth. Analog output signals can represent items such as opening a valve to a desired position. The digital signals may be digital input (DI) or digital output (DO) signals. Digital input signals are either ON or OFF. Digital input signals are typically used to control items that have only two states, e.g., Alarm or Normal conditions. Digital output signals also typically used to control items that only have two states, e.g., Start or Stop. In a preferred embodiment, one apparatus can be configured for analog input and digital input signals, and another apparatus can be configured for analog output and digital output signals.

Figure 6:
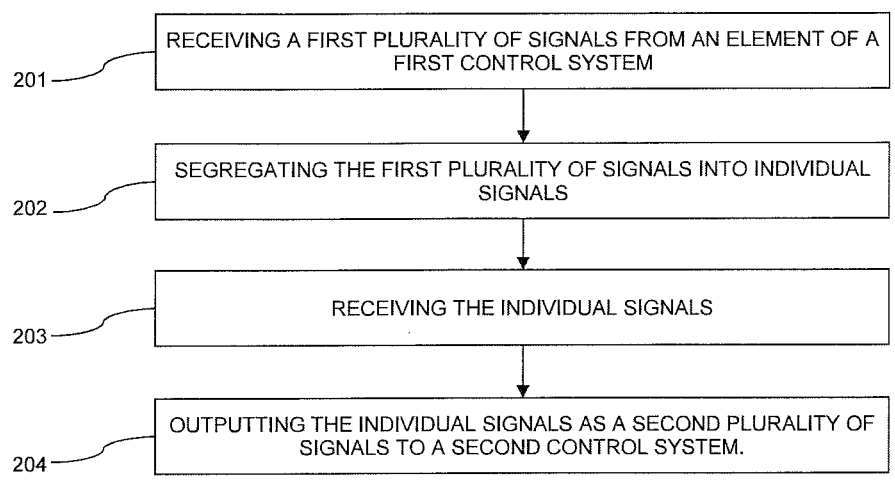
FIG. 6 is a flowchart depicting a method for migrating at least one element from a first control system to a second control system according to this invention.

As shown in FIG. 6, a method for integrating controls systems is another aspect of this invention. In operation, as shown at 201, the input module receives the first plurality of signals from the field wiring of the first control system. The first plurality of signals is transmitted from filed wiring of the first control system to the input module using the input ribbon cable. The input ribbon cable is connected to the input ribbon cable adaptor 111. As shown at 202, the first plurality of signals is segregated into individual signals by the plurality of break-out terminals 112. The plurality of break-out terminals 112 transmits each individual signal to the isolation module. In a typical arrangement, two conductors per individual signal are provided. If needed, the isolation module can be configured to eliminate the passing of the signal between the two modules as discussed above. Otherwise, the isolation module transmits the individual signals to the output module. As shown at 203, the individual signals are received by the break-in terminals 131. The break-in terminals 131 transmit the individual signals to the output cable adaptor 132. As shown at 204, the output cable adaptor 132 outputs the individual signals as the second plurality of signals, and the second plurality of signals is sent to the second control system via the output cable.

Any reference to patents, documents and other writings contained herein shall not be construed as an admission as to their status with respect to being or not being prior art. Although the present invention and its advantages have been described in detail, it is understood that the array of features and embodiments taught herein may be combined and rearranged in a large number of additional combinations not directly disclosed, as will be apparent to one having ordinary skill in the art. The invention disclosed herein may be practiced in the absence of any element which is not specifically disclosed herein. It should be understood that various changes, substitutions and alterations can be made herein without departing from the spirit and scope of the invention as defined by the following claims. There are, of course, other embodiments, which are alternatives to the foregoing descriptions of the invention, which are intended to be included within the scope of the invention, as defined by the following claims.

What is claimed is:

1. An apparatus for migrating a first control system to a second control system, the apparatus comprising:
   a. an input module configured to receive a first plurality of signals from an element of the first control system and segregate the first plurality of signals into individual signals;
   b. an isolation module electrically connected to said input module, said isolation module configured to pass or block the individual signals; and
   c. an output module electrically connected to said isolation module, said output module configured to receive the individual signals from the isolation module and output the individual signals as a second plurality of signals to the second control system.

2. The apparatus of claim 1, wherein the element is at least one field wire.

3. The apparatus of claim 2, wherein the first plurality of signals comprise analog or digital signals.

4. The apparatus of claim 3, wherein the first plurality of signals is selected from a group consisting of a number of signals that is a multiple of ten.

5. The apparatus of claim 4, wherein the second plurality of signals is selected from a group consisting of a number of signals that is a multiple of eight.

6. The apparatus of claim 5, wherein the input module comprises:
   a. at least one input ribbon cable adaptor for receiving and segregating the first plurality of signals; and
   b. a plurality of break-out terminals electrically connected to said at least one input ribbon cable adaptor, said plurality of break-out terminals capable of making each individual signal available for hard wiring.

7. The apparatus of claim 6, wherein the isolation module comprises:
   a. at least one signal isolator.

8. The apparatus of claim 7, wherein the output module comprises:
   a. a plurality of break-in terminals configured to receive the individual signals; and
   b. at least one output cable adaptor electrically connected to said plurality of break-in terminals, said at least one output cable adaptor configured to output the individual signals.

9. The apparatus of claim 8, wherein an input ribbon cable is configured to send the first plurality of signals from the element of the first control system to the input module.

10. The apparatus of claim 9, wherein an output cable is configured to send the second plurality of signals from the output module to the second control system.

11. A method for migrating a first control system to a second control system, the method comprising:
    a. receiving a first plurality of signals from an element of the first control system, wherein the first plurality of signals are received by an input module configured to receive and segregate the first plurality of signals, the input module comprising at least one input ribbon cable adaptor electrically connected to a plurality of signal break-out terminals;
    b. segregating the first plurality of signals into individual signals in an isolation module configured to pass or block the first plurality of signals; and
    c. receiving and outputting the individual signals as a second plurality of signals to the second control system.

12. The method of claim 11, wherein the element is at least one field wire.

13. The method of claim 12, wherein the first plurality of signals comprise analog or digital signals.

14. The method of claim 13, wherein the first plurality of signals is selected from a group consisting of a number of signals that is a multiple of ten.

15. The method of claim 14, wherein the second plurality of signals is selected from a group consisting of a number of signals that is a multiple of eight.

16. The method of claim 15, wherein an output module receives and outputs the individual signals as the second plurality of signals to the second control system, the output module comprising:
    a. a plurality of break-in terminals electrically connected to
    b. at least one output cable adaptor.

17. The method of claim 16, wherein an input ribbon cable sends the first plurality of signals from the element of the first control system to the input module.

18. The method of claim 17, wherein an output cable sends the second plurality of signals from the output module to the second control system.

\* \* \* \* \*